United States Patent [19]

Dreher et al.

[11] 3,830,302

[45] Aug. 20, 1974

[54] METHOD FOR IMPROVING OIL-WATER RATIOS IN OIL PRODUCING WELLS

[75] Inventors: Karl D. Dreher; Robert D. Sydansk, both of Littleton, Colo.

[73] Assignee: Marathon Oil Company, Findlay, Ohio

[22] Filed: June 25, 1973

[21] Appl. No.: 373,327

[52] U.S. Cl............................. 166/294, 166/305 R
[51] Int. Cl..................... E21b 33/138, E21b 43/25
[58] Field of Search................ 166/274, 275, 305 R

[56] References Cited
UNITED STATES PATENTS

| | | | |
|---|---|---|---|
| 2,331,594 | 10/1943 | Blair, Jr. .......................... | 166/305 R |
| 3,087,543 | 4/1963 | Arendt................................ | 166/295 |
| 3,212,577 | 10/1965 | Holbert et al........................ | 166/295 |
| 3,247,900 | 4/1966 | Perry et al. ...................... | 166/295 X |
| 3,308,885 | 3/1967 | Sandiford.................. | 166/305 R X |
| 3,376,924 | 4/1968 | Felsenthal et al................... | 166/263 |
| 3,452,817 | 7/1969 | Fallgatter......................... | 166/305 R |
| 3,687,200 | 8/1972 | Routson........................... | 166/295 X |
| 3,718,187 | 2/1973 | Milton, Jr. ...................... | 166/295 X |
| 3,721,295 | 3/1973 | Bott................................... | 166/295 |
| 3,724,551 | 4/1973 | Troscinski et al. ................. | 166/295 |

*Primary Examiner*—Stephen J. Novosad

[57] ABSTRACT

Reduction in the water-oil-ratio of producing wells is obtained by treating the formation in the vicinity of the production well with a combination of an aqueous, organic polyelectrolyte, e.g., partially hydrolyzed, high molecular weight polyacrylamide solution, and a cationic surfactant, e.g., alkyl trimethylammonium halide, dialkyl dimethyl ammonium halide, sulfonium compound or pyridinium compound, or by first treating the well with the aqueous polyelectrolyte solution and then treating the formation with the cationic surfactant. This treatment increases relative permeability to the flow of hydrocarbon while decreasing or at least not increasing the permeability to the flow of water. About 0.01 to about 1 percent by weight of the cationic surfactant is useful for this process.

10 Claims, No Drawings

METHOD FOR IMPROVING OIL-WATER RATIOS IN OIL PRODUCING WELLS

BACKGROUND OF THE INVENTION

1. Field of the Invention

This invention relates to injecting at least one slug into a production well in fluid communication with a subterranean hydrocarbon-containing formation to improve the oil-water ratio of produced fluids from the well.

2. Description of the Prior Art

Arendt teaches in U.S. Pat. No. 3,087,543 that the oil-water ratio of a producing well can be improved by treating the entire producing interval with an acrylamide carboxylic acid copolymer. Sandiford in U.S. Pat. No. 3,308,885 improves the oil-to-water ratio by treating the production interval with an water-soluble, partially hydrolyzed polyacrylamide having a molecular weight in excess of about 200,000 and wherein about 8 to about 70 percent of the amide groups are hydrolyzed to carboxyl groups.

U.S. Pat. No. 3,376,924 to Felsenthal et al. uses quaternary ammonium compounds, e.g., trimethyl octyl ammonium chloride, and U.S. Pat. No. 3,283,812 to Ahearn et al. uses alkyl pyridinium salts and quaternary ammonium salts as surfactants in water-flooding oil-bearing reservoirs.

The prior art has used methods to block off the water zones of a producing well, e.g., it has tried cement or chemicals to block the water producing zones. Generally, these processes have met with failure because it is not possible to obtain complete control of positioning the blocking material at the water zone without blocking the hydrocarbon producing zones. Also these processes are generally expensive. In certain cases, the total volume of fluids that can be produced is limited by the size of the wellbore and the equipment associated therewith. Thus, if large quantities of water are produced, it can in effect shut down or make uneconomical the operation of the well.

Applicants have discovered an improved process of increasing the oil-to-water ratio of a production well wherein polyelectrolytes are used.

SUMMARY OF THE INVENTION

To an aqueous, organic polyelectrolyte solution there is added a cationic surfactant (alkyl trimethylammonium halide, dialkyl dimethyl ammonium halide,, sulfonium compounds, or pyrridium compounds) and the combination used to treat the production zone or the aqueous polyelectrolyte solution can be followed by an aqueous solution containing the cationic surfactant.

DESCRIPTION OF THE PREFERRED EMBODIMENTS

In general, any organic polyelectrolyte is useful with the invention. The polyelectrolyte can be a homopolymer, copolymer, terpolymer, etc. or modification thereof. It is preferred that they be synthesized to readily plug or sorb onto the reservoir rock to effect the desired "blocking" of the reservoir to the flow of water. Specific examples of useful polymers include the partially hydrolyzed, high molecular weight polyacrylamides, e.g., the Pusher polymers, marketed by Dow Chemical Co., Midland, Michigan; copolymers of acrylamide and sodium acrylate or acrylic acid such as commercially available polymers from Nalco Chemical Co., Petroleum Division, Houston, Texas; copolymers available from Betz Laboratories, Inc. Trevose, Pennsylvania, and identified as Betz Uni-Perm and Betz Hi-Vis polymers and other Betz polymers, and polymers obtained commercially from the Water Management Division, Calgon Corp., Pitts., Pa. Preferably, the polymers are strongly anionic and are either partially hydrolyzed, high molecular weight polyacrylamides or copolymers of acrylamide and sodium acrylate. Patents defining polyelectrolytes useful with this invention include U.S. Pat. Nos. 3,308,885 to Sandiford; 3,087,543 to Arendt; 2,827,964 to Sandiford; 3,039,529 to McKennon; 2,842,492 to Engelhardt et al.; 3,002,960 to Kolodny; 3,025,237 and 3,070,158 to Roper; 3,370,647 to Wolgemuth; and 3,399,725 to Pye.

The cationic surfactant is generally defined as a alkyl trimethyl ammonium halide, dialkyl dimethyl ammonium halide, a sulfonium compound or a pyridinium compound. The alkyl trimethyl ammonium halides have the general formula:

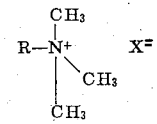

wherein $R$ is an alkyl containing about eight to about twenty-two carbon atoms and preferably about twelve to about sixteen carbon atoms, and $X$ is chloride, bromide, or iodide. Dialkyl dimethyl ammonium halides are defined by the formula:

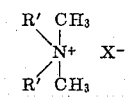

wherein $R'$ is alkyl containing about eight to about twelve carbon atoms and $X$ is chloride, bromide, or iodide. The sulfonium compounds are identified by the formula:

$$R^2 - (C_2H_5)(CH_3)S^+X^-$$

wherein $R^2$ is an alkyl containing about eight to about twenty and preferably about ten to about sixteen and more preferably about twelve to about fourteen carbon atoms, and $X$ is chloride, bromide, or iodide. The pyridinium compounds are identified by:

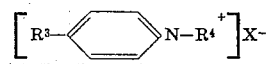

wherein $R^3$ is alkyl grouping containing about two to about fifteen carbon atoms, $R^4$ is alkyl containing about one to about ten carbon atoms and $X$ is chloride, bromide, or iodide. Mixtures of the above cationic surfactants are also useful.

The cationic surfactant can be admixed with the aqueous polyelectrolyte solution. About 1 to about 500 gallons and preferably about 5 to about 300 gallons of the aqueous polyelectrolyte solution is useful to treat the producing formation. Cationic surfactant concentrations within the polyelectrolyte solution can be about 0.001 to about 1 percent or more and preferably about 0.01 to about 0.5 percent and more preferably about 0.05 to about 0.1 percent by weight. If the cationic surfactant is to follow the aqueous polyelectrolyte solution, then about 1 to about 500 gallons and preferably about 5 to about 250 gallons of an aqueous cationic surfactant solution per vertical foot of producing formation to be treated is injected behind the aqueous polyelectrolyte solution, the surfactant solution containing about 0.001 to about 1 percent or more and preferably about 0.01 to about 0.5 percent and more preferably about 0.05 to about 0.1 percent by weight of the cationic surfactant. The aqueous polyelectrolyte solution and/or the surfactant solution can contain other additives to impart desired characteristics; however, these additives should not substantially influence the properties of the polyelectrolyte and/or cationic surfactant to adhere or "plug" the reservoir rock pores.

Water useful to make up the solutions, i.e., the aqueous polyelectrolyte and/or cationic surfactant solution can contain rather large quantities of salt. However, it is preferred that the salt concentration be below 10,000 ppm. of TDS (total dissolved solids) and more preferably below about 5,000 ppm of TDS.

EXAMPLES

The following examples are presented to teach specific working embodiments of the invention. Unless otherwise specified, all percents are based on weight. In Example 1, the water contains 540 ppm of TDS.

EXAMPLE 1

A clean Berea sandstone core 3 inches in length and 1 inch in diameter is flooded with water, permeability to the water is determined to be 232 md. The core is first treated by injecting and displacing therethrough 19 PV (pore volumes) of water containing 350 ppm of partially hydrolyzed, high molecular-weight polyacrylamide (Dow Pusher Polymer 700). The core is thereafter flooded with water and permeability is 10 md. The core is then flooded with hydrocarbon having a viscosity of 0.92 cp. at 23 C and the permeability to the hydrocarbon is 48 md. Thereafter, the core is flooded with 3.5 PV of water and the permeability is 3 md. The core is then flooded with 15 PV of water containing 1,000 ppm of an alkyl trimethyl ammonium halide wherein the alkyl contains twelve carbon atoms and the halide is bromide. The core flooded with 10 PV of water and the permeability is 10 md. Thereafter 50 PV of the hydrocarbon (0.92 cp at 23°C) is flooded through the core sample and the permeability is 102 md. Review of these floods is outlined in Table I:

TABLE I

| Flood | Fluid | Permeability |
| --- | --- | --- |
| 1 | Water | 232 md |
| 2 | 350 ppm polymer | — |
| 3 | Water | 10 md |
| 4 | Hydrocarbon | 48 md |
| 5 | Water | 3 md |
| 6 | 1000 ppm R(CH$_3$)$_3$ NBr | — |
| 7 | Water | 10 md |
| 8 | Hydrocarbon | 102 md |

From the above data, it is evident that after treatment of the core with the cationic surfactant, the permeability to the hydrocarbon increased from 48 md to 102 md while the permeability to the water increased from 3 md to 10 md. If the permeability of the core in flood 1 was determined at residual oil saturation, it is calculated that it would be 46 md.

EXAMPLE 2

A production well having a "pay" thickness of about 20 feet is producing a high water-to-oil ratio and the economics of keeping the producing well on stream is questionable. The well is treated by injecting into the formation 5,000 gallons of an aqueous solution containing 300 ppm of Dow Pusher 1,000 polymer (a partially hydrolyzed, ultra high molecular weight polyacrylamide) and 1,000 ppm of a pyridinium compound having the formula:

After treatment, the production well is returned to production and a substantial decrease in the water-to-oil is realized while the oil production is substantially the same. The well is now economically productive.

Modifications of this invention obvious to those skilled in the art are intended to be included within the scope of the invention as defined in the specification and appended claims.

What is claimed is:

1. In a process of improving the oil-to-water ratio of a production well in fluid communication with a subterranean oil-containing formation wherein an aqueous, organic polyelectrolyte solution is used to treat the producing formation, the step comprising incorporating within the aqueous polyelectrolyte solution at least about 0.001 percent by weight of cationic surfactant selected from the group consisting of:

1. an alkyl trimethyl ammonium halide of the formula:

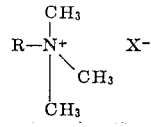

wherein R is alkyl containing about eight to about twenty-two carbon atoms, and X is chloride, bromide, or iodide, 2. a dialkyl dimethyl ammonium halide of the formula:

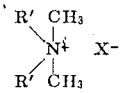

wherein R' is alkyl containing about eight to about 12 carbon atoms and X is chloride, bromide, or iodide, 3. a sulfonium compound of the formula:

$$R^2-(C_2H_5)(CH_3)S^+ \; X^-$$

wherein $R^2$ is alkyl containing about eight to about twenty-two carbon atoms and $X$ is chloride, bromide, or iodide, 4. a pyridinium compound of the formula:

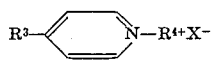

wherein $R^3$ is alkyl containing about two to about fifteen carbon atoms, $R^4$ is alkyl containing one to about 10 carbon atoms, and $X$ is chloride, bromide, or iodide, or 4. a mixture of two or more of the above surfactants.

2. The process of claim 1 wherein the polyelectrolyte is a partially hydrolyzed, high molecular weight polyacrylamide.

3. The process of claim 1 wherein the polyelectrolyte is a copolymer of acrylamide and sodium acrylate or acrylic acid.

4. The process of claim 1 wherein the cationic surfactant is the alkyl trimethyl ammonium halide.

5. The process of claim 1 wherein the cationic surfactant concentration is about 0.001 percent to about 1 percent by weight.

6. In a process of improving the oil-to-water ratio of a production well in fluid communication with a subterranean oil-containing formation wherein an aqueous polyelectrolyte solution is used to treat the formation, the step comprising injecting behind the aqueous polyelectrolyte solution an aqueous solution containing at least about 0.001 percent by weight of cationic surfactant selected from the group consisting of:

1. an alkyl trimethyl ammonium halide of the formula:

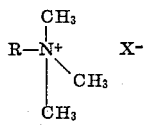

wherein $R$ is alkyl containing about eight to about 22 carbon atoms, and $X$ is chloride, bromide, or iodide, 2. a dialkyl dimethyl ammonium halide of the formula:

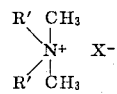

wherein $R'$ is alkyl containing about eight to about 12 carbon atoms and $X$ is chloride, bromide, or iodide, 3. a sulfonium compound of the formula:

$$R^2-(CH_2H_5)(CH_3)S^+ \; X^-$$

wherein $R^2$ is alkyl containing about eight to about 22 carbon atoms and $X$ is chloride, bromide, or iodide, 4. a pyridinium compound of the formula:

wherein $R^3$ is alkyl containing about two to about fifteen carbon atoms, $R^4$ is alkyl containing one to about 10 carbon atoms, and $X$ is chloride, bromide, or iodide, or 5. a mixture of two or more of the above surfactants.

7. The process of claim 6 wherein the cationic surfactant is the alkyl trimethyl ammonium halide.

8. The process of claim 6 wherein the halide of surfactant is chloride.

9. The process of claim 6 wherein the polyelectrolyte is a copolymer of acrylamide and sodium acrylate or acrylic acid.

10. The process of claim 6 wherein the polyelectrolyte is a partially hydrolyzed, high molecular wieght polyacrylamide.

* * * * *

UNITED STATES PATENT OFFICE
CERTIFICATE OF CORRECTION

Patent No. 3,830,302　　　　　　　Dated Aug 20, 1974

Inventor(s): Karl D. Dreher et al

It is certified that error appears in the above-identified patent and that said Letters Patent are hereby corrected as shown below:

Col. 5, line 10:　　Insert brackets before beginning of formula and between "$R^4$" and "+" so that the formula will appear as follows:

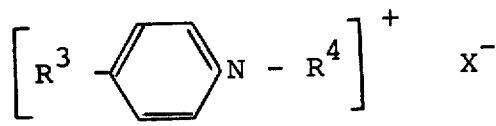　　$X^-$

Col. 5, line 17:　　Delete "4" at beginning of line since this is not a new claim.

Col. 6, lines 24-25:　　Delete "$R^2-(CH_2H_5)(CH_3)S^+ X^-$"

and insert:

$-- R^2-(C_2H_5)(CH_3)S^+ X^- --$.

Signed and sealed this 18th day of February 1975.

(SEAL)
Attest:

RUTH C. MASON
Attesting Officer

C. MARSHALL DANN
Commissioner of Patents
and Trademarks